United States Patent [19]

Lokhoff et al.

[11] Patent Number: 5,373,399
[45] Date of Patent: Dec. 13, 1994

[54] OVERLOAD DETECTION AND STORAGE OF OVERLOAD MARKERS IN AN ARRANGEMENT FOR RECORDING AN ANALOG SIGNAL ON A RECORD CARRIER

[75] Inventors: Gerardus Lokhoff; Gijsbrecht C. Wirtz, both of Eindhoven, Netherlands

[73] Assignee: U.S. Philips Corporation, New York, N.Y.

[21] Appl. No.: 233,844

[22] Filed: Apr. 26, 1994

Related U.S. Application Data

[62] Division of Ser. No. 978,101, Nov. 19, 1992.

[30] Foreign Application Priority Data

Nov. 19, 1991 [EP] European Pat. Off. ........ 91203003.8

[51] Int. Cl.[5] ................. G11B 5/09; G11B 27/36; G11B 15/48
[52] U.S. Cl. ................. 360/32; 360/31; 360/74.1
[58] Field of Search ............ 360/31, 32, 96, 74.1; 341/118, 131, 139, 155, 158; 375/26, 30

[56] References Cited

U.S. PATENT DOCUMENTS

| 4,156,430 | 5/1979 | King et al. | 128/419 PT |
| 4,914,439 | 4/1990 | Nakahashi et al. | 341/131 |
| 4,951,051 | 8/1990 | Place | 341/118 |
| 5,051,799 | 9/1991 | Paul et al. | 375/25 |

Primary Examiner—Donald Hajec
Assistant Examiner—Won Tae C. Kim
Attorney, Agent, or Firm—Edward W. Goodman

[57] ABSTRACT

An arrangement (60) for recording an analog signal in a track on a record carrier (82) is provided with an overload detection circuit (78) for detection an overload situation for the analog signal applied to the arrangement. Upon detection of an overload situation, the recording mode is terminated and the record carrier is rewound to the start location of the current recording. Further, the arrangement is provided with a variable attenuator (66). The variable attenuation factor in the attenuator is increased upon detection of the overload situation.

3 Claims, 3 Drawing Sheets

OVERLOAD DETECTION AND STORAGE OF OVERLOAD MARKERS IN AN ARRANGEMENT FOR RECORDING AN ANALOG SIGNAL ON A RECORD CARRIER

CROSS-REFERENCE TO RELATED APPLICATIONS

This is a division of U.S. patent application Ser. No. 07/978,101, filed Nov. 19, 1992.

BACKGROUND OF THE INVENTION

1. Field of the Invention

The invention relates to an arrangement for recording an analog signal in a track on a record carrier in a recording mode, comprising
- an input terminal for receiving the analog signal,
- variable attenuator means, having an input coupled to the input terminal and an output,
- conversion means, having an input coupled to the output of the variable attenuator means, and an output, the conversion means being adapted for converting the signal applied to its input into a second signal and for supplying the second signal to the output,
- writing means, having an input coupled to the output of the conversion means, for writing the second signal in at least one track on the record carrier,
- record carrier transport control means for generating a control signal at an output, and
- record carrier transport means, having a control signal input coupled to the output of the record carrier transport control means, for realizing a first relative movement of the write means relative to the record carrier during the writing of the second signal in the track in said recording mode, in response to a first control signal generated by the record carrier transport control means, so as to enable the writing of the second signal in the track.

The invention also relates to a combination of said arrangement and an analog signal generator means for supplying said analog signal.

2. Description of the Related Art

An arrangement as claimed in the opening paragraph is known in the form of present day magnetic audio recorders. If the signal to be recorded should be recorded in digital form, it is known to realize such digital recording by means of an RDAT or SDAT digital audio recorder. In such apparatuses, an analog audio signal is digitized and recorded in tracks on a magnetic tape, which tracks run in a slant or in a longitudinal direction respectively across the tape.

The arrangement as described in the opening paragraph can also be a disc recorder, e.g. a recorder in which the signal is recorded, for instance in digital form, on a disc-shaped record carrier by means of, e.g. a magneto-optic recording method.

Prior to recording the analog signal, the signal can be amplified, so as to control the recording level of the signal to be recorded such that no overload occurs. The amplification factor can be controlled manually by actuating a volume control knob.

The known arrangement has the disadvantage that, with the amplification factor set to a specific value, still overloads can occur because of large signal amplitudes present in the signal to be recorded.

SUMMARY OF THE INVENTION

The invention has for its object to provide an arrangement as given in the opening paragraph, which offers an improved behavior in the case of the occurrence of overloads.

To that purpose, the arrangement is characterized in that the arrangement further comprises
- overload detection means for detecting an overload situation for the analog signal applied to the arrangement, and
- attenuator control signal generator means for generating at an output an attenuator control signal upon the detection of an overload situation, the output being coupled to a control signal input of the variable attenuator means, the arrangement being adapted to terminate the recording mode upon detection of the overload situation, to terminate the first relative movement of the writing means relative to the record carrier, to switch over to a second relative movement of the writing means relative to the record carrier so as to position the write means at a location substantially corresponding to the start location of the recording of the second signal on the record carrier, and to stop the second relative movement at said location, the variable attenuator means being adapted to increase the attenuation upon receipt of the attenuator control signal.

The invention is based on the recognition that measures should be provided to easily rerecord an analog signal if during the recording of said analog signal overloads occur. Analog signals are for instance the music pieces reproduced in analog form by means of an analog signal generator means, such as a CD player having an analog output. During reproduction, the CD player supplies the subsequent music pieces, with short silence intervals between each two subsequent music pieces, via its analog output to the input terminal of the arrangement. The music pieces are recorded on the record carrier in the recording arrangement.

During the recording of the music piece, the overload detection means can detect an overload situation. An overload occurs if a signal to be recorded has a too large amplitude compared to the acceptable amplitude range for a substantially undistorted signal processing in the arrangement. Various ways of determining whether an overload occurs, are possible.

One possibility is that the signal amplitudes are compared to a threshold amplitude in a comparator. Signal amplitudes exceeding the threshold amplitude during a certain minimum time interval are an indication of an overload. The threshold amplitude has been chosen such that signal amplitudes below the threshold amplitude can be processed substantially undistorted in the arrangement.

In the case that the analog signal is recorded in digital form on the record carrier, another possibility is that the overload detection means detect the presence of a maximum signal amplitude that occur during a certain minimum time interval at the output of the A/D converter. A maximum signal amplitude at the output of the A/D converter means that the signal amplitude of the analog signal is equal to or larger than the maximum input range of the A/D converter. If such a situation occurs, it is assumed that an overload exists.

If an overload occurs, it may result in a distorted recording of the music piece. If a number of N overloads have occurred, it is assumed that the recording is unacceptable from a quality point of view. This is an indication that an overload situation has occurred. N is an integer, larger than or equal to 1.

In the further discussion of the invention it is assumed that the arrangement according to the invention is an arrangement for recording the analog signal on a tape-shaped record carrier.

In the case of an overload situation, the recording is terminated, and the arrangement is switched over to a rewind mode, so as to rewind the record carrier to the position on the record carrier where the recording of that specific music piece had started. The arrangement can issue an alarm signal, e.g. in the form of an acoustic or optical signal, so as to inform the user of the occurrence of an overload situation. Further, the amplification factor of the attenuator means is reduced (or the attenuation factor is increased) to a certain extent. Upon reaching this start location, the transport of the record carrier is stopped, and the arrangement is ready for re-recording the music piece. As the attenuation factor has increased, a re-recording can be possible in which the occurrence of overloads and thus the occurrence of overload situations is minimized, or even precluded.

Upon manual actuation of a record button on the arrangement, as well as on manual actuation of a repeat button on the analog signal generator means, a re-recording of the music piece can take place.

The arrangement may be further characterized in that the arrangement is further adapted to supply a repeat control signal to a control signal output after the detection of the overload situation, and in that the arrangement is further adapted to subsequently switch over to a recording mode, so as to re-record the second signal. In this case, if the arrangement cooperates with an analog signal generator means which comprises a control signal input for receiving a repeat control signal, and in which the signal generator means is adapted to stop the supply of the analog signal and to restart the generation of the analog signal from the beginning, upon the receipt of the repeat control signal, an automatic re-recording of the music piece takes place. This is of special relevance in that, the user can start the recording of one or more consecutive music pieces, and need not further check the recording, while in the end, an undistorted recording of the one or more music pieces is realized.

In a preferred embodiment, the arrangement is characterized in that position indicator generator means are provided for generating at an output a position indicator upon the start of the recording of a second signal, the position indicator being an indication of the location of the start position of the recording of the second signal on the record carrier, the output being coupled to an input of storage means, the storage means being further adapted to store the position indicator, and that the arrangement is adapted to stop the second relative movement at a location substantially corresponding to the position indicator lastly stored. During the recording of a music piece, the start of the music piece is detected, e.g. by means of the detection of the transition from the silence interval to the beginning of the music piece.

A position indicator, indicating the start location of the recording of the music piece on the record carrier is stored. One possibility is that the count value of a tape length counter is stored as the position indicator in a memory. Preferably a start marker is generated at the start of the recording of the music piece and the start marker is recorded on the record carrier as well, at a location on the record career indicating the start position of the recording of the music piece on the record carrier. In this way an accurate indication of the start location of the recording has been obtained.

In an embodiment in which an automatic re-recording of the music piece(s) in the case of an overload situation can be realized, the combination of the arrangement and the analog signal generator means, which analog signal generator means comprises a signal output for supplying an analog signal, for recording on a record carrier by means of the arrangement, the signal generator means further comprising a control signal input for receiving a repeat control signal, the signal generator means being adapted to stop the supply of the analog signal and to restart the generation of the analog signal from the beginning, upon the receipt of the repeat control signal, is characterized in that the signal output of the analog signal generator means is coupled to the input terminal of the arrangement, and the control signal output of the arrangement is coupled to the control signal input of the analog signal generator means.

It should be noted that analog signal generator means such as characterized above are known, and are used in combination with analog audio recorders of the magnetic type in order to ensure that a music piece that is recorded only partly on the final part of one side of the tape, is re-recorded on the beginning pan of the other side of that tape after an auto-reverse action. It is however not known to use the analog signal generator means in a combination according to the present invention, in order to prevent low quality recordings because of occurring overloads.

As has been said previously, the invention also relates to arrangements in which the analog signal is recorded (in digital form) on a disc-shaped record carrier. In that case, the record carrier rotates around its central position during the recording mode, while the write means move inwards or outwards in a radial direction relative to the rotating record carrier.

The repositioning of the write means to the location of the record carrier substantially corresponding to the start location of the recording of the second signal on the record carrier, is earned out with said second relative movement, which is an outwards or inwards movement respectively in the radial direction of the record carrier.

The invention can also be applied to arrangements in which the analog signal is stored in digital form in a digital memory, such as a random access memory.

In another aspect of the invention, overload marks are generated upon the detection of an overload. The overload marks can either be counted in a counter, or can be recorded on the record carrier. If the number of overload marks counted in the counter exceeds a predetermined amount, it is concluded that an overload situation was present which requires a re-recording of the analog signal. To that end the arrangement can generate a control signal that can be used to generate an alarm signal or to increase the attenuation factor.

In the situation where the overload marks are recorded on the record career, the overload marks need to be detected and counted in a rewind mode following the recording mode for the recording of the analog signal. The number of overload marks thus counted can be compared in the way given above with the predetermined amount to generate the control signal.

BRIEF DESCRIPTION OF THE DRAWINGS

These and other aspects of the invention will be apparent from and elucidated with reference to the embodiments described hereinafter in the drawings, in which.

DESCRIPTION OF THE PREFERRED EMBODIMENT

Figure 1:
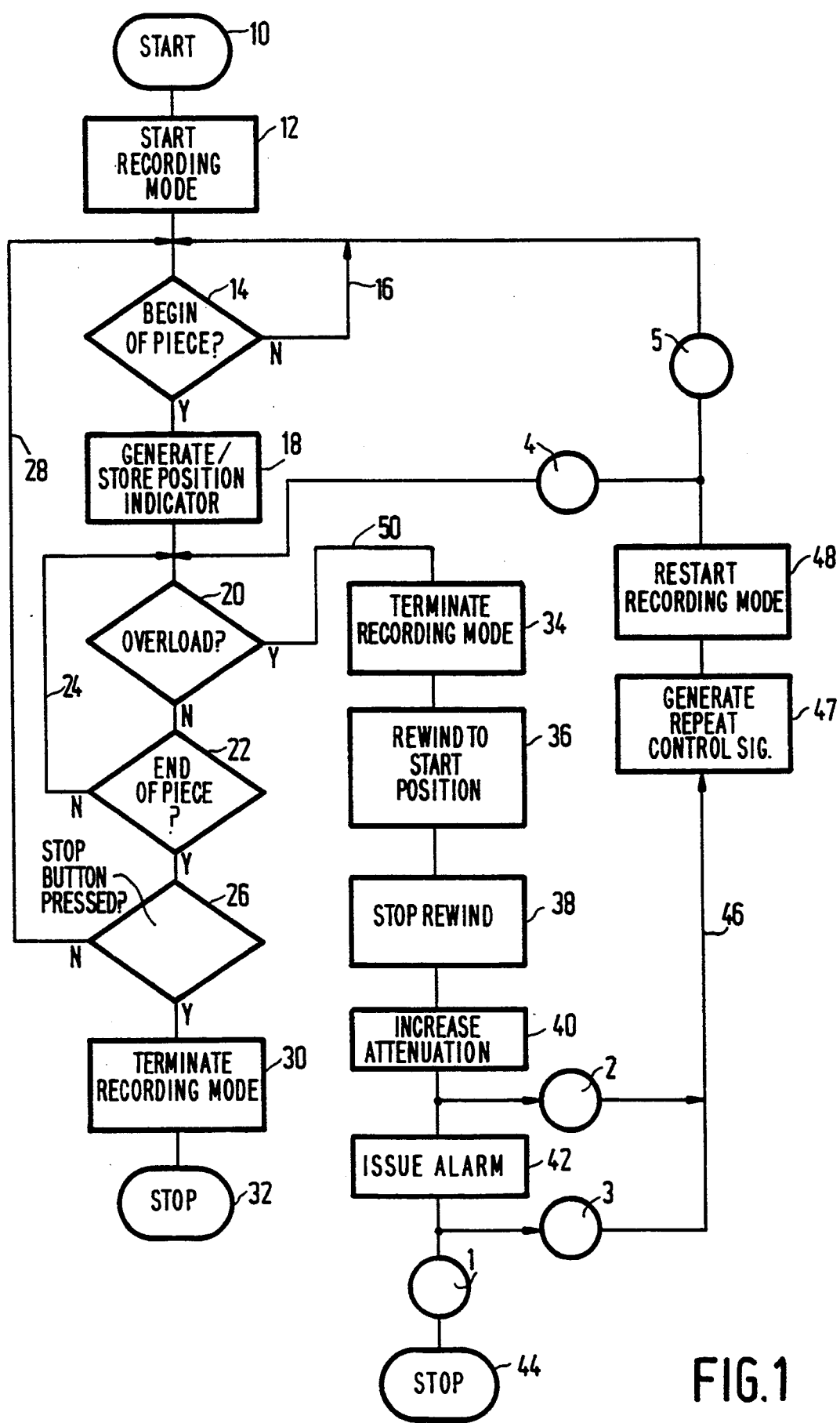
FIG. 1 is a flow chart showing the method of operation of the arrangement.

FIG. 1 discloses a number of possible operations of the arrangement of the invention, by means of a flow chart. It is assumed here that the arrangement is an arrangement for recording the analog signal on a longitudinal tape-shaped record carier. The flow chart in FIG. 1 starts in block 10, and runs to a block 12 in which the recording mode is started, e.g. by means of a manual actuation of a RECORD button on the arrangement by the user. Further, the user actuates the analog signal generator means, so that it generates the analog signal to be recorded by the arrangement on the record carrier.

As has been said previously, position indicator generator means are provided for generating at an output a position indicator upon the start of the recording of a second digital signal, the position indicator being an indication of the location of the start of the recording of the second digital signal on the record carrier. In one embodiment, the position indicator generator means generate said position indicator in response to the actuation of the RECORD button. However, in the case that a number of subsequent music pieces generated by the analog signal generator means should be recorded on the record carrier, without any further intervention of the user, a different way of activating the position indicator generator means is preferred. One such way of activating the position indicator generator means is disclosed in FIG. 1 by means of the blocks 14 and 18. In block 14 it is detected whether a transition from a silence interval, that occur prior to the music piece, to the start of the music piece takes place. If no such transition is detected, the program runs via line 16, so that the detection mode remains activated. Upon detection of the transition, the program runs to block 18, in which the position indicator is generated and stored. As stated previously, this position indicator can be a tape count value which is stored in a memory included in the arrangement, or can be a start marker that is recorded on the record carrier.

During the recording of the music piece, it is detected in block 20 whether an overload situation occurs. If no overload situation is detected during the recording of the music piece, the program continues via the blocks 22 and 26, so that after the recording of a music piece the next music piece can be recorded, provided that the STOP button has not been actuated by the user. The program runs via the line 28, so as to start the recording of the next music piece. Upon the detection of an actuation of the STOP button in the block 26, the program runs to block 30 in which the recording mode is terminated, and the program ends in block 32.

If an overload situation is detected in block 20, the program continues via the flow path 50 to block 34, in which the recording mode is terminated. The record carrier is rewound to the begin position of the recording of the music piece, in block 36. The detection of the begin position can be realized in various ways. The position indicator, stored as tape counter value in the memory, can be compared during the rewinding operation with the tape counter output signal indicating the actual position of the record carrier. If coincidence between both values is detected, the rewinding operation will be stopped in block 38. An other possibility is to detect the start marker recorded lastly on the record carrier, and to stop the rewinding operation upon detection of the start marker. Further the attenuation in the variable attenuator means is increased in block 40. It should be understood that the order in which block 40 is included in the flow path 50 is not critical.

The program can now continue in various ways. Continuing the program via the path indicated by the encircled number 1 means that an acoustic or optical alarm signal is issued in block 42, and that the program is terminated in block 44. The user is now aware of the fact that an overload situation occurred and that a re-recording of the music piece should be activated, such as by restarting the program via block 10.

Another way of continuing the program is via the encircled path number 2, where the recording mode is restarted automatically in block 48. Prior to this, a repeat control signal is generated in block 47. The repeat control signal should be supplied to the analog signal generator means, so as to restart the reproduction of the music piece from the beginning in the signal generator means. If needed also an alarm signal can be generated, so that the program runs via block 42 in the encircled path 3 to block 47. After having passed block 48, the program can continue via the encircled path 4, which means that the position indicator (tape count value or start marker) stored (in the memory and on the record carrier respectively) is maintained. Care should be taken that the re-recording of the music piece is carried out such that the previous recording of the same music piece is fully erased.

If the program continues via the encircled path 5, also the position indicator is restored (the tape count value being restored in the memory in place of the previous tape count value, and the start marker is re-recorded on the record carrier, whilst the previous start marker is erased).

It should be noted here, that the use of the position indicator is not essential. This means that the blocks 14 and 18 may be dispensed with. The way of finding the start position in the block 36 is now different, in that no position indicator is present that can be used as indicator of that start position. The start position can be determined by detecting the transition from the music piece to the silence interval preceding the music piece during the rewind mode.

Figures 2, 3:
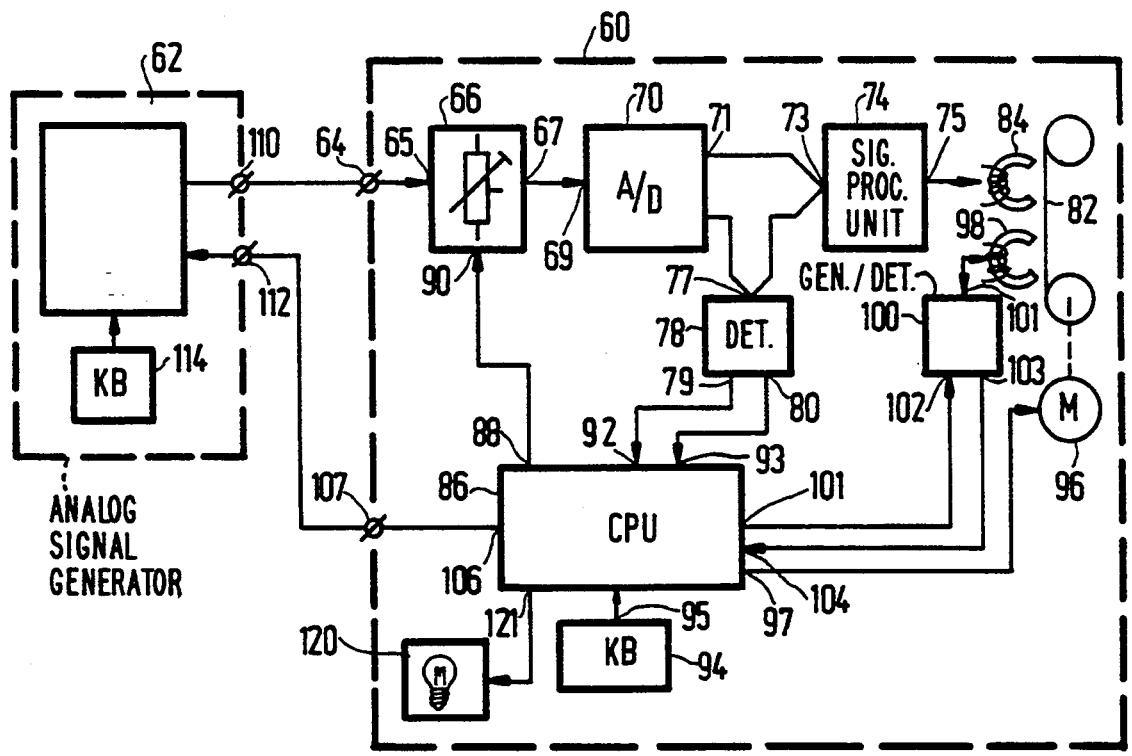
FIG. 2 shows a block diagram of the combination of an arrangement and an analog signal generating means.
FIG. 3 shows a block diagram of another combination of an arrangement and an analog signal generating means.

FIG. 2 discloses a combination of the arrangement 60 and the analog signal generator means 62. An input terminal 64 of the arrangement 60 is coupled to an input 65 of an attenuator 66, an output 67 of which is coupled to an input 69 of an A/D converter 70. The A/D converter 70 converts the analog signal applied to its input 69 into a digital signal which is applied in the form of a sequence of m-bit digital words in parallel to the output 71. This (first) digital signal is applied to inputs 73 and 77 of a signal processing unit 74 and a detector 78, respectively. The processing unit 74 is adapted to process the first digital signal applied to its input 73 so as to obtain a second digital signal which is applied in serial form to its output 75, for recording on the record carrier 82 by means of a write head 84. One or more write heads are available for recording the second digital signal in one or more tracks on the record carrier 82.

The arrangement 60 is provided with a central processing unit 86. A control signal output 88 of CPU 86 is coupled with a control signal input 90 of the variable attenuator 66. Outputs 79 and 80 of the detector 78 are coupled to corresponding inputs 92 and 93, respectively, of CPU 86. Control commands from the user can be applied to the CPU 86 by manually actuating the buttons on a keyboard 94. The control signals thus generated are applied to the CPU 86 via an electrical connection 95.

It is schematically indicated that a tape transport motor 96 is provided for transporting the record carrier 82 along the head 84. The CPU 86 generates a motor control signal via the output 97 to the motor 96, so as to control and realize a certain motor speed in a certain direction.

Further a read/write head 98 is provided, which is electrically coupled to a generator and detector circuit 100. A control signal output 101 of CPU 86 is coupled to a control signal input 102 of the generator/detector circuit 100, and a control signal output 103 of the generator/detector circuit 100 is coupled to a control signal input 104 of the CPU 86.

The arrangement 60 is provided with a repeat control signal output 107, which is coupled to a control signal output 106 of CPU 86. The repeat control signal output 107 is coupled to a repeat control signal input 112 of the analog signal generator means 62. The means 62 have an analog signal output terminal 110 which is coupled to the input terminal 64 of the arrangement 60. The means 62 can further be controlled by the user by means of a manual actuation of buttons on a keyboard 114.

The functioning of the combination is as follows. Upon actuation of a RECORD button on the keyboard 94 and the actuation of a PLAY button on the keyboard 114, the arrangement 60 can start recording a music piece that is supplied by the means 62 to the arrangement via the output 110 and the input terminal 64. Under the influence of a control signal supplied to the attenuator 66 via the control signal input 90, the attenuator 66 is set to a specific attenuation level. Suppose that the generator means 62 starts supplying a silence signal prior to the generation of the music piece. In that situation the A/D converter supplies a zero level digital signal to the input 77 of the detector 78.

The detector 78 includes a comparator (not shown) which compares the digital signal applied to its input 77 with a threshold amplitude which is slightly larger than zero, so that the transition from silence to music can be detected. Upon the detection of this transition, an detection signal is generated at the output 79. Upon receipt of this detection signal by the CPU 86, the CPU 86 generates a control signal at the output 101. Upon receipt of this control signal by the read/write means 100, the means 100 generate a start marker at its terminal 101, which start marker is recorded by the head 98 in the record carrier 82. The start marker can be recorded in a track in which also the second digital signal is recorded. Another possibility is that the start marker is recorded in a separate track, such as the AUX track in an digital audio recorder of the DCC type, see the published European patent application no. 436,991 A1 (PHN 13209).

The detector 78 also includes a comparator (not shown) which compares the digital signal applied to its input 77 with a threshold amplitude which is equal to or slightly smaller than the maximum digital amplitude that can be generated by the A/D converter 70. If the A/D converter generates a digital signal which is equal to the maximum digital amplitude, or which is larger than said threshold amplitude, it is concluded that an overload situation occurs. This means that N is assumed to be equal to 1 in this case. Upon the detection of the overload situation, a detection signal is generated at the output 80. Upon receipt of this detection signal by the CPU 86, the CPU 86 generates control signals at the outputs 88 and 97. Under the influence of the control signal at the output 97, the motor 96 stop, and switches over to a transport of the record carrier in the reverse direction. Under the influence of the control signal applied to its input 90, the attenuator means 66 increases its attenuation to a certain extent. The increase in attenuation can be a fixed value. Suppose that the arrangement would have been provided with means to determine how large the overload amplitude was compared to the threshold amplitude. In that case it is possible to increase the attenuation to an amount which has a certain relationship to the amount of overload.

The detector circuit 100 and the head 98 are in a reproduction mode of, and a detection mode for the start markers, during the rewind mode for the record carrier. Upon a detection of the first start marker reproduced in this rewind mode, the circuit 100 generates a detection signal at its output 103, which detection signal is supplied to the input 104 of CPU 86. Upon receipt of this detection signal the CPU 86 generates another control signal at the output 97, which is supplied to the motor 96, so that the rewind mode is stopped.

In the case that the arrangement 60 is provided with an overload alarm 120, in this case in the form of a lamp, the CPU 86 generates an activation signal at an output 121, so as to activate the alarm.

The CPU 86 further generates the repeat control signal at the output 106, which is supplied to the generator means 62, as well as a further control signal via the output 97 to the motor, so that the motor is driven in the record mode, for re-recording the music piece. Under the influence of the repeat control signal applied to the input 112, the generator means 62 starts the reproduction of the music piece from the beginning, so that it can be re-recorded on the record carrier.

As has been said previously, there is no need for recording start markers on the record carrier. It is also possible to store a tape count value, indicating the start location of the recording on the record carrier, in a memory. This start location can be refound in the rewind mode by comparing this count value with the running count value of a tape counter, which is coupled e.g. by means of a tacho generator to the take-up reel, the supply reel or the capstan.

Another possibility to determine in the rewind mode the start position of the recording on the record carrier is to detect the transition from music to silence in the digital signal reproduced from the record carrier during this rewind mode. This means that the elements having the reference numerals 98, 100 and the signal connection from the output 79 to input 92 can be dispensed with. Only the overload detection signal need to be supplied by the detector 78 to the CPU 86. Further, the head 84 should be able to reproduce the digital signal from the record carrier in the rewind mode for the record carrier, and further an additional detector (not shown) needs to be present, which has an input coupled to the output of the head 84, so as to detect the first transition from music to silence that occur in the signal reproduced. Upon detection of such transition, the detector generates a transition detection signal which is applied to the CPU 86. Under the influence of this detection signal the CPU 86 generates the repeat signal at its output 106, and a control signal at its output 97, so as to switch over to the re-recording mode, for re-recording the music piece.

It is to be noted that the invention is not limited to the embodiments described in the figure description. The invention is equally well applicable to those embodiments which differ from the embodiments described in aspects which are not relevant to the invention. As has been explained hereinbefore, the invention can also be applied in arrangements in which the analog signal is recorded in analog form on a record carrier. Further, the record carrier need not be a longitudinal tape shaped record carrier, but can also be a disc shaped record carrier. The disc shaped record carrier can be a magnetic record carrier or a magneto-optical record carrier.

FIG. 3 shows an embodiment 60' of the recording arrangement according to the invention which includes a digital memory 130, such as a random access memory, to store the digital signal that comes from the A/D converter 70. If necessary, the digital signal from the A/D converter 70 is converted in additional conversion means, such as the conversion means 74 in FIG. 2, so as to obtain for instance a further data reduction, before the signal is stored in the memory 130. An address generator 131 is provided for addressing the storage locations in the memory 130 by means of addresses supplied to the memory via the connection 132. Further, a connection 133 is provided between the address generator 131 and a start address memory 135, in which the starting address for the storage of the signal in the memory 130 is stored. A connection 134 is provided for supplying a control signal from the CPU to the address generator 131, so as to control the start of the generation of subsequent addresses upon the start of the storage of the digital signal in the memory 131. The arrangement of FIG. 3 further largely resembles the arrangement of FIG. 2.

The functioning of the arrangement of FIG. 3 will be explained briefly hereafter.

The beginning of the music piece to be stored is indicated by the signal generated by the detector 78 at the output 79 and supplied to the input 92 of CPU 86. Upon receipt of this signal, the CPU 86 generates a control signal via the line 134. The address generator 131 starts supplying subsequent addresses, starting from a certain starting address, via the connection 132 to the memory 130. Further, the start address that is supplied to the memory 135 via the connection 133, is stored in said memory 135. Upon the occurrence of an overload situation determined by the CPU 86 from the one or more overloads detected by the detector 78, a second control signal is supplied to the address generator 131 via the line 134. The address generator 131 is reset to its starting address, by retrieving this starting address from the memory 135. Further, the control signal is supplied from the CPU 86, via its output 88, to the control input 90 of the attenuator 66, so as to increase the attenuation factor. An explanation of the further functioning of the arrangement of FIG. 3 is not necessary, in that this further functioning can be the same as that of the arrangement of FIG. 2.

Figure 4:
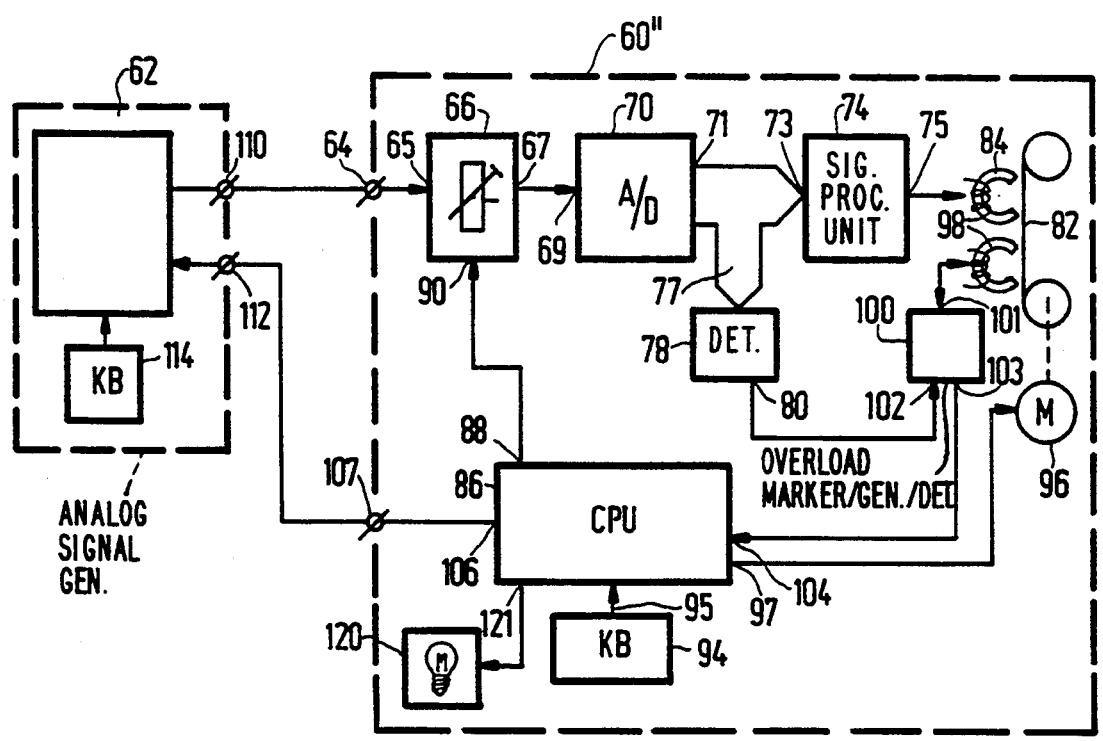
FIG. 4 shows a block diagram of yet another embodiment of the arrangement.

FIG. 4 discloses again another embodiment of the recording arrangement, which arrangement is therefore provided with the reference numeral 60''. The arrangement largely resembles the arrangement 60 of FIG. 2.

The output 80 of the detector 78 is now coupled to the input 102 of the generator/detector circuit 100, so that an overload mark can be recorded on the record carrier upon the detection, of an overload by the detector circuit 78. The overload mark can be recorded in the AUX track, in the same way as described with reference to the recording of the start marker, see the figure description for FIG. 2. In this embodiment, it is assumed that the total recording of the digital signal is realized, without an interruption because of any overload detected. Upon termination of the recording mode, the record carrier is switched over to the (fast) rewind mode, in which the head 98 can detect the overload marks (if any) recorded on the record carrier. The detector circuit 100 includes a counter which counts the overload marks detected. If the number of overload marks detected exceeds a predetermined value, it is concluded that a re-recording should take place. The record carrier is positioned at the starting location, and the attenuation factor of the attenuator 66 can be increased. The re-recording of the music piece can be started in the same ways as described with reference to FIG. 2.

Legends to the Blocks in FIG. 1

10 start
12 start recording mode
14 detection of begin of music piece?
18 generate and store position indicator
20 detection of overload situation?
22 detection of end of music piece?
26 STOP button actuated?
30 stop recording mode
32 stop
34 stop recording mode
36 rewind to start position of recording of music piece
38 stop rewind mode
40 increase attenuation
42 issue alarm signal
44 stop
48 restart recording mode

We claim:

1. Arrangement for recording an analog signal in a track on a record carrier in a recording mode, comprising:
   an input terminal for receiving the analog signal;
   variable attenuator means, having an input coupled to the input terminal and an output;
   conversion means, having an input coupled to the output of the variable attenuator means, and an output, the conversion means being adapted for converting the signal applied to its input into a second signal and for supplying the second signal to the output;
   writing means, having an input coupled to the output of the conversion means, for writing the second signal in at least one track on the record carrier;

record carrier transport control means for generating a control signal at an output; and record carrier transport means, having a control signal input coupled to the output of the record carrier transport control means, for realizing a first relative movement of the write means relative to the record carrier during the writing of the second signal in the track in said recording mode, in response to a first control signal generated by the record carrier transport control means, so as to enable the writing of the second signal in the track, characterized in that the arrangement further comprises:

overload detection means for detecting an overload situation for the analog signal applied to the arrangement and for generating an overload marker upon detection of an overload situation; wherein the arrangement is adapted to store the number of overload markers generated during the recording of the analog signal in the recording mode, and to retrieve the number of overload markers upon termination of the recording mode for the analog signal.

2. Arrangement as claimed in claim 1, characterized in that, the arrangement is adapted to store the number of overload markers generated in a memory, and to retrieve the number of overload markers stored in said memory upon termination of the recording mode, and to issue a control signal if the number of overload markers retrieved from said memory exceeds a predetermined amount.

3. Arrangement as claimed in claim 1, characterized in that, the arrangement is adapted to record the overload markers generated on the record carrier during the recording mode for the analog signal to be recorded, to switch over to a rewind mode for the record carrier upon completion of the recording mode for said analog signal, and to retrieve the overload markers recorded on the record carrier during said rewind mode following said recording mode, and to terminate said rewind mode upon reaching the start location of the recording of the analog signal on the record carrier, that the arrangement is provided with a counter for counting the number of overload markers retrieved during said rewind mode, and that the arrangement is further adapted to issue a control signal if the number of overload markers counted by said counter exceeds a predetermined amount.

* * * * *